(12) United States Patent
Son (10) Patent No.: US 10,880,161 B2
(45) Date of Patent: Dec. 29, 2020

(54) NETWORK INFORMATION STORAGE SERVICE PROVIDING METHOD AND APPARATUS FOR TERMINAL

(71) Applicant: Samsung Electronics Co., Ltd, Suwon-si (KR)

(72) Inventor: Jungje Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/481,019

(22) PCT Filed: Jan. 31, 2018

(86) PCT No.: PCT/KR2018/001309
§ 371 (c)(1),
(2) Date: Jul. 25, 2019

(87) PCT Pub. No.: WO2018/143657
PCT Pub. Date: Aug. 9, 2018

(65) Prior Publication Data
US 2020/0007390 A1  Jan. 2, 2020

(30) Foreign Application Priority Data
Feb. 2, 2017  (KR) ........................ 10-2017-0015122

(51) Int. Cl.
*G06F 15/16* (2006.01)
*H04L 12/24* (2006.01)
(Continued)

(52) U.S. Cl.
CPC ...... *H04L 41/0806* (2013.01); *H04L 65/1073* (2013.01); *H04W 4/50* (2018.02)

(58) Field of Classification Search
CPC ... H04L 41/0806; H04L 65/1073; H04W 4/50
(Continued)

(56) References Cited

U.S. PATENT DOCUMENTS 7,409,219 B2 *  8/2008  Levitan ................. H04W 4/029
 455/456.6
8,577,610 B2 * 11/2013  Shao ................... G01C 21/3476
 701/537

(Continued)

FOREIGN PATENT DOCUMENTS

KR  10-2006-0118889 A  11/2006
KR  10-0676625 B1  1/2007
(Continued)

OTHER PUBLICATIONS

International Search Report dated May 1, 2018 in connection with International Patent Application No. PCT/KR2018/001309, 2 pages.
(Continued)

*Primary Examiner* — Alicia Baturay (57) ABSTRACT

The present disclosure relates to a communication technique for converging an IoT technology with a 5G communication system for supporting a higher data transmission rate beyond a 4G system, and a system therefor. The present disclosure may be applied to an intelligent service (for example, a smart home, a smart building, a smart city, a smart car or connected car, healthcare, digital education, retail business, a security and safety related service, or the like) on the basis of a 5G communication technology and an IoT related technology. An embodiment of the present invention may provide an information providing method for a terminal and an apparatus for performing the same, the method comprising the steps of: receiving a registration request including a condition for providing information to an application; storing the condition for providing information; checking whether information corresponding to the condition for providing information has been collected; and when the information corresponding to the condition for providing
(Continued)

information has been identified, providing the information to the application.

11 Claims, 8 Drawing Sheets

(51) Int. Cl.
*H04W 4/50* (2018.01)
*H04L 29/06* (2006.01)

(58) Field of Classification Search
USPC .......................................................... 709/217
See application file for complete search history.

(56) References Cited

U.S. PATENT DOCUMENTS

| | | | |
|---|---|---|---|
| 8,787,928 B2 | 7/2014 | Choi et al. | |
| 9,065,908 B2* | 6/2015 | Buer | H04M 3/42357 |
| 9,451,037 B2 | 9/2016 | Strandell et al. | |
| 9,648,581 B1* | 5/2017 | Vaynblat | G06Q 50/01 |
| 9,672,538 B1* | 6/2017 | Vaynblat | G06Q 30/0267 |
| 9,674,660 B1* | 6/2017 | Vaynblat | H04W 64/006 |
| 9,788,160 B1* | 10/2017 | Gu | H04W 4/021 |
| 9,852,443 B1* | 12/2017 | Vaynblat | G06F 16/9535 |
| 9,860,699 B1* | 1/2018 | Vaynblat | H04L 67/02 |
| 9,898,763 B1* | 2/2018 | Vaynblat | G06Q 50/01 |
| 10,051,688 B1* | 8/2018 | Huang | H04W 52/0206 |
| 10,157,224 B2* | 12/2018 | Kazi | H04L 67/20 |
| 10,187,484 B2* | 1/2019 | Taine | H04L 67/22 |
| 10,193,894 B2* | 1/2019 | Meredith | H04W 12/08 |
| 10,216,351 B2* | 2/2019 | Yang | G06F 3/04845 |
| 10,216,850 B2* | 2/2019 | Kazi | G06Q 50/01 |
| 10,235,863 B2* | 3/2019 | Adler | H04W 4/029 |
| 10,242,074 B2* | 3/2019 | Kazi | G06F 16/24578 |
| 10,262,039 B1* | 4/2019 | Ramanathan | G06F 16/9536 |
| 10,270,882 B2* | 4/2019 | Kazi | H04L 51/18 |
| 10,304,147 B2* | 5/2019 | Kelly | G07F 11/52 |
| 10,360,593 B2* | 7/2019 | Hunter | H04H 20/61 |
| 10,382,608 B2* | 8/2019 | Gerhardt | H04L 63/0492 |
| 10,417,638 B2* | 9/2019 | Pitz | G06Q 20/32 |
| 10,419,907 B2* | 9/2019 | Redding | H04M 3/42178 |
| 10,565,589 B2* | 2/2020 | Pitz | H04W 4/021 |
| 10,600,041 B2* | 3/2020 | Kelly | G06Q 20/202 |
| 10,602,305 B2* | 3/2020 | McKay | H04W 4/80 |
| 10,638,255 B2* | 4/2020 | Lyman | H04B 7/0417 |
| 2007/0287475 A1 | 12/2007 | Jeong et al. | |
| 2010/0095251 A1* | 4/2010 | Dunko | H04M 1/72572 715/863 |
| 2013/0217333 A1* | 8/2013 | Sprigg | H04W 4/80 455/41.2 |
| 2013/0268353 A1* | 10/2013 | Zeto, III | G06Q 30/02 705/14.45 |
| 2013/0275198 A1* | 10/2013 | Zeto, III | G06Q 30/0267 705/14.26 |
| 2013/0275221 A1* | 10/2013 | Zeto, III | G06Q 30/02 705/14.58 |
| 2013/0324166 A1* | 12/2013 | Mian | H04W 4/021 455/457 |
| 2015/0094949 A1 | 4/2015 | Kato et al. | |
| 2015/0141045 A1* | 5/2015 | Qiu | H04W 4/021 455/456.1 |
| 2016/0034961 A1* | 2/2016 | May | G06Q 30/0261 705/14.58 |
| 2018/0336625 A1* | 11/2018 | Singh | G06Q 30/0267 |
| 2020/0007390 A1* | 1/2020 | Son | H04L 29/08 |
| 2020/0112606 A1* | 4/2020 | Nanduri | H04L 69/329 |

FOREIGN PATENT DOCUMENTS

| | | |
|---|---|---|
| KR | 10-2009-0084211 A | 8/2009 |
| KR | 10-2011-0106039 A1 | 9/2011 |
| KR | 10-1148441 B1 | 5/2012 |
| KR | 10-1207003 B1 | 12/2012 |

OTHER PUBLICATIONS

Written Opinion of the International Searching Authority dated May 1, 2018 in connection with International Patent Application No. PCT/KR2018/001309, 6 pages.

Supplementary European Search Report dated Aug. 22, 2019 in connection with European Patent Application No. 18 74 7875, 6 pages.

Communication pursuant to Article 94(3) EPC in connection with European Application No. 18747875.5 dated Mar. 16, 2020, 4 pages.

* cited by examiner

NETWORK INFORMATION STORAGE SERVICE PROVIDING METHOD AND APPARATUS FOR TERMINAL

CROSS-REFERENCE TO RELATED APPLICATIONS

This application is a 371 of International Application No. PCT/KR2018/001309 filed on Jan. 31, 2018, which claims priority to Korean Patent Application No. 10-2017-0015122 filed on Feb. 2, 2017, the disclosures of which are herein incorporated by reference in their entirety.

BACKGROUND

1. Field

The disclosure relates to a method of providing a service on the basis of network information of a terminal. More particularly, the disclosure relates to a method of efficiently managing an application by a terminal.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network. In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

Meanwhile, the Internet has been evolved to an Internet of things (IoT) network in which distributed components such as objects exchange and process information from a human-oriented connection network in which humans generate and consume information. An Internet of everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information technology (IT) and various industries.

Accordingly, various attempts to apply the 5G communication to the IoT network have been made. For example, technologies such as a sensor network, machine to machine (M2M), and machine type communication (MTC) are implemented by beamforming, MIMO, and array antenna schemes which correspond to the 5G communication technology. The application of a cloud RAN as a big data processing technology may be an example of convergence of 5G technology and IoT technology.

A technical solution achieved by the disclosure is to provide a method and an apparatus for efficiently managing an application by a terminal (user equipment (UE)).

Further, another technical solution achieved by the disclosure is to provide a method and an apparatus for efficiently managing a UE on the basis of network information stored in the UE.

SUMMARY

In accordance with an aspect of the disclosure, a method of providing information by a terminal is provided. The method includes: receiving a registration request including an information provision condition to an application; storing the information provision condition; identifying whether information corresponding to the information provision condition is collected; and when the information corresponding to the information provision condition is identified, providing the information to the application.

In accordance with another aspect of the disclosure, a terminal is provided. The terminal includes: an information collector configured to collect information on a the terminal; and an information manager configured to receive a registration request including an information provision condition to an application, store the information provision condition, identify whether information corresponding to the information provision condition is collected, and when the information corresponding to the information provision condition is identified, provide the information to the application.

The technical subjects pursued in the disclosure may not be limited to the above mentioned technical subjects, and other technical subjects which are not mentioned may be clearly understood, through the following descriptions, by those skilled in the art of the disclosure.

According to an embodiment of the disclosure, it is possible to provide a method and an apparatus for efficiently managing a UE on the basis of network information stored in the UE.

According to an embodiment of the disclosure, for an operation of a service according to a state of the UE such as a location and a time, an application of the UE can register a state condition of the UE for initiating the service in a network information storage device in the UE, provide the service by activating the application when a corresponding condition is met, and reduce the unnecessary use of memory in the UE and the unnecessary use of power.

DETAILED DESCRIPTION

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the present disclosure unclear will be omitted.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

A recent wireless communication UE may install applications into the UE and provide a service by executing the applications. The applications have a function of providing a service on the basis specific network information (UE location and UE state) such as a location-based advertisement. If the applications provide a network information-based service, the applications maintain an activated state in the UE even when the user is not using the applications, and makes a request for the network information to peripheral devices of the UE to collect the network information and, when network information that meets a particular condition is collected, provides a service. The applications collect information through an individual link with peripheral devices of the UE. In the prior art, if each application in the UE monitors a state condition of the UE and identifies whether a condition for initiating a service is met while each application is not being used, efficiency of the UE may deteriorate. Through embodiments of the disclosure, a network information storage device in the UE allows each of the registered applications to monitor a state condition indicating whether a service initiation condition is met and, when a particular condition is met even in the state in which each application is deactivated, activates the applications and allows the applications to provide services. According to embodiments of the disclosure, it is possible to reduce the unnecessary use of memory in the UE and the unnecessary use of power.

Embodiments of the disclosure have been made to provide a service informing at least one application stored in a mobile communication UE of state information of the UE and characteristic of the disclosure corresponding to an operation process of the UE based on a processing method according to the disclosure.

Figure 1:
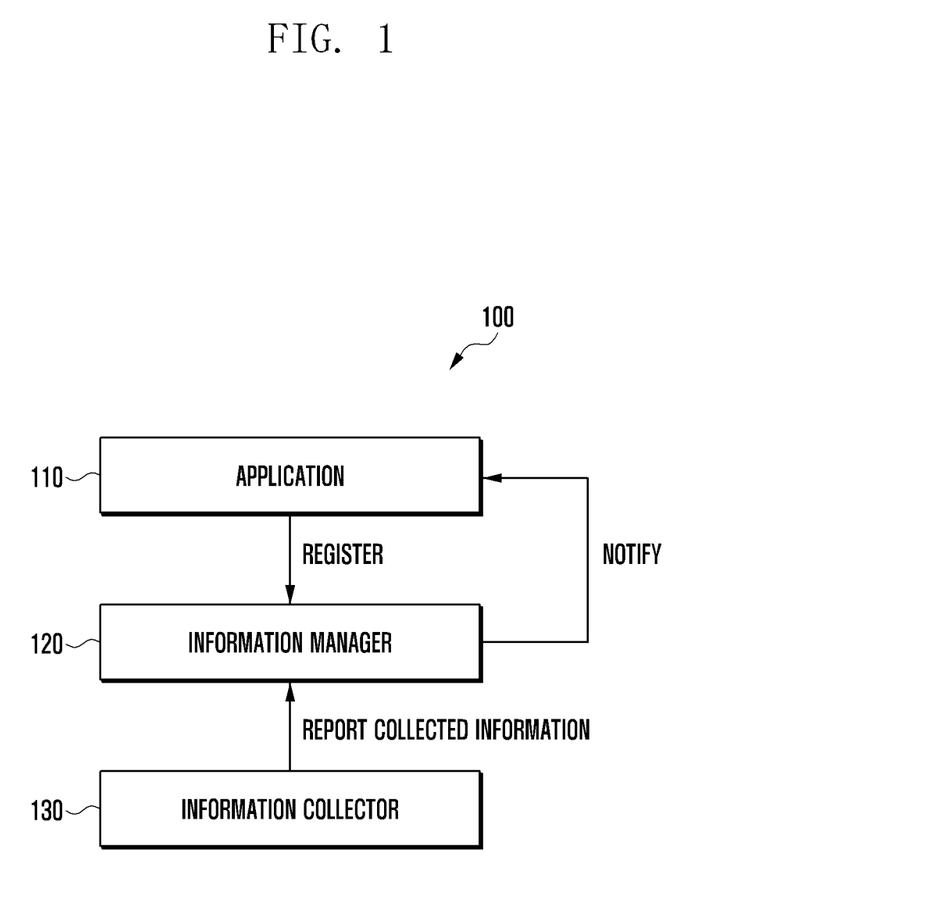
FIG. 1 illustrates the relation between an application of a UE and a device configuration according to an embodiment of the disclosure.

FIG. 1 illustrates the relation between an application of a UE and a device configuration according to an embodiment of the disclosure.

Referring to FIG. 1, a UE 100 may include an application 110, an information manager 120, and an information collector 130.

The UE 100 may install the application 110 therein. The application 110 may be software executed by the UE 100 and at least one application 100 may be installed in the UE 100. The application 100 may provide a service to the user on the basis of network information or state information. The network information or the state information may be named UE information.

The application 110 performs a procedure of registration in the information manager 120 in order to receive the UE information from the information manager 120. For example, when UE information preset in the UE 100 is collected during the registration procedure, the corresponding information or the collection of the corresponding information may be notified to the application 110 or a request for controlling switching the state of the application from an inactive state to an active state is made to the information manager 120. The application 100 may receive a notification from the information manager 120 and, when the application is in the inactive state, may be switched to the active state on the basis of the notification.

The UE information may include information on a mobile communication base station which the UE accesses, a cell ID, a tracking area information, routing area information, roaming information, information on an access point (AP) to which the UE is connected, information on a connection state of the UE (state information indicating whether the UE is in a connected state or an idle state), information indicating the location of the UE through a global positioning system (GPS), information on a date and time, or information collected through other sensor devices. For example, information collected through a touch sensor, a proximity sensor, an electromagnetic sensor, a pressure sensor, and an acceleration sensor may be UE information. Further, information generated by analyzing the information may also be UE information. For example, location information of the UE analyzed or estimated from the cell ID may be UE information. The UE information is not limited to above-mentioned information and may include information collected by the UE 100 through the information collector 130 and any information analyzed or estimated from the collected information. Meanwhile, the location information may be information having a preset range from a particular location.

The information manager 120 may be included in a controller of the UE or may be a separate device controlled by the controller of the UE. The information manager 120 may be named a network context repository or a network information repository. When collecting UE information requested by the application 110, the information manager 120 may receive a request for informing the application 110 of the collection of the UE information and store particular UE information requested by the application 110. Since a plurality of applications exists in the UE 100, the information manager 120 may store information such that UE-specific information is mapped to each application.

If the UE information acquired from the information collector 130 includes information requested by the application 110 to receive or information requested by the application 110 to be informed of or if the condition configured through the registration procedure with the application 110 is met, the information manager 120 may notify the application 110 of the corresponding or collection of the corresponding information.

The information manger 120 may periodically receive or acquire UE information from the information collector 130. The information manager 120 may aperiodically receive or acquire UE information. For example, when a preset event is generated, UE information may be received or acquired from the information collector 130. In order to aperiodically collect UE information, a user input may be input into the UE 110 or a trigger condition for aperiodically collecting UE information may be preset. The trigger condition may be set in at least one of the information manager 120 or the information collector 130. The information manager 120 may identify whether particular UE information corresponding to the application 110 is collected on the basis of the UE information and notify the application of the identification result. When the application 110 is in the inactive state, a notification may be provided to activate the application. After activating the application 110, the information manager may provide UE information corresponding to the application 110 to the application 110.

The information collector 130 may be a device which collects, measures, and acquires UE information such as network information or state information. The information collector 130 may be a portion of the controller of the UE 100 or a device controlled by the controller. The information collector 130 may provide collected, measured, and acquired UE information to the information manager 120. The information collector 130 may provide UE information to the information manager 120 according to a preset period. Further, if there is a request for providing aperiodic UE information or a trigger condition for aperiodic UE information transmission is satisfied, the UE information may be aperiodically provided to the information manager 120.

The information manager may be named an information management device, and the information collector may be named an information collection device. The information management device may include at least one processor. The information collector may include at least one processor.

Figure 2:
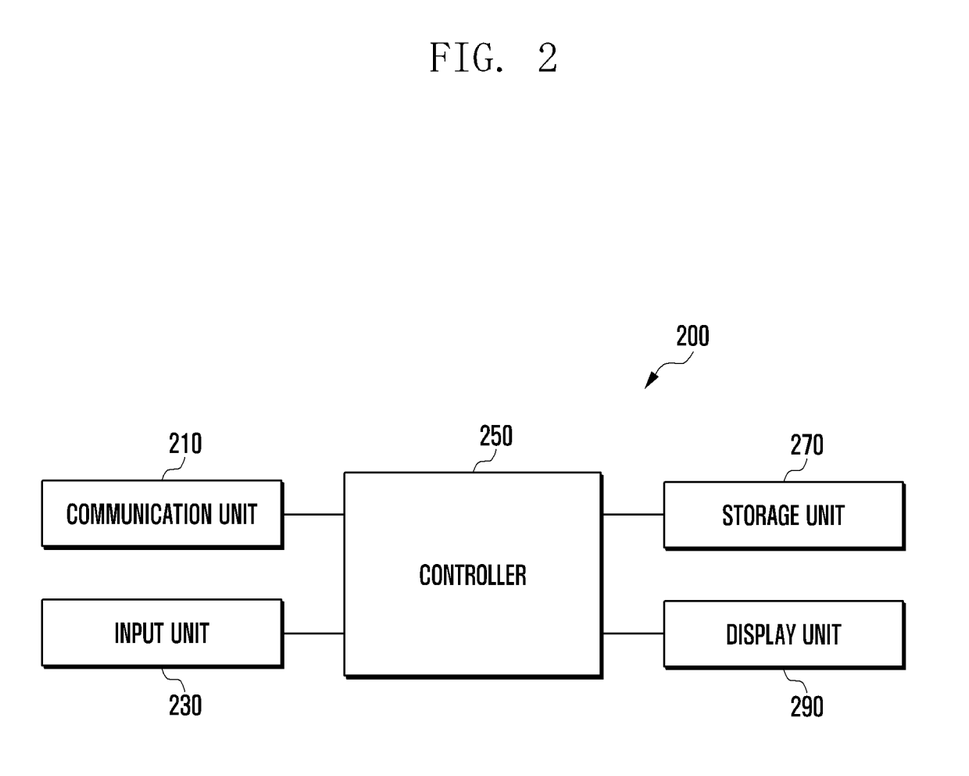
FIG. 2 illustrates a UE according to an embodiment of the disclosure.

FIG. 2 illustrates a UE according to an embodiment of the disclosure.

Referring to FIG. 2, a UE 200 may include at least one of a communication unit 210, an input unit 230, a controller 250, a storage unit 270, and a display unit 290.

The communication unit 210 may include one or more modules for allowing the UE 200 to perform wireless communication in a wireless communication system.

Specifically, the communication unit 210 transmits and receives a wireless signal to and from at least one of a base station, another UE, a communication node, and a server in a mobile communication network. The wireless signal may include a voice call signal, a video call signal, or various types of data according to text/multimedia message transmission/reception. Further, the communication unit 210 may exchange data with external devices by using communication technologies such as wireless local area network (WLAN), Wi-Fi, wireless broadband (Wibro), world interoperability for microwave access (Wimax), high speed downlink packet access (HSDPA), and the like.

The input unit 230 may detect a user's input and transmit an input signal corresponding to the user's input to the controller 250. The input unit 230 may include a keypad, a dome switch, a touch pad (resistive type/capacitive type), a jog wheel, a jog switch, a finger mouse, and a wheel.

The input unit 230 may include a touch sensor, a proximity sensor, an electromagnetic sensor, a pressure sensor, an acceleration sensor, and a positioning sensor. The input unit 230 may detect a user's touch input or proximity input through a sensor. The input unit 230 may include an input pad generated by attaching a sensor on a pad in a file form or combining them in a panel form. For example, the input unit 230 may include an electro magnetic resonance (EMR) type input pad or an electromagnetic interference (EMI) type input pad, which uses an electromagnetic sensor. The input unit 230 may generate a control signal that may contain information on a location of a detected input, an input means, and an input type and transfer the control signal to the controller 250.

The input unit 230 may form a layer structure together with the display unit 290, which will be described below, to operate as an input screen. For example, the input unit 230 may be configured by a touch screen panel (TSP) including an input pad having a touch sensor and connected with the display unit 209. The input unit 230 forming the layer structure together with the display unit 290 may be referred to as a touch screen.

The controller 250 may control the overall operation of the UE 200. The controller 250 may control the operation of the UE described in each embodiment of the disclosure. The controller 250 may include at least one processor. The controller 250 may control the communication unit 210, the input unit 230, the storage unit 270, and the display unit 290.

The controller 250 may include an information manager according to an embodiment of the disclosure. The information manager may be included in the controller 250 or may be outside the controller 250 and operate according to the control of the controller 250. The controller 250 may include an information collector. The information collector may collect information through a link to the communication unit 110 and the input unit 130.

According to an embodiment of the disclosure, the information manager may perform control to receive a registration request including an information provision condition for an application, store the information provision condition, identify whether information corresponding to the information provision condition is collected, and when the information corresponding to the information provision condition is identified, provide the information to the application.

According to an embodiment of the disclosure, when the application is in an inactive state, the information manager may switch the application to an active state and, when the application is switched to the active state, provide information on the UE. The inactive state may be a state in which the application does not use a memory of the UE.

According to an embodiment of the disclosure, the information manager may perform control to identify whether the application has a right to receive the information and, when it is determined that the application has the right, store the information provision condition. When it is determined that the application has no right, the information manager may perform control to reject the registration request containing the information provision condition and maintain the active state of the application.

Further, according to an embodiment of the disclosure, the information provision condition may include location information. When the location information of the UE is collected, the information manager may perform control to determine whether the location information of the UE corresponds to location information of the information provision condition. If the location information of the UE corresponds to the location information of the information provision condition, the location information of the UE may be provided to the application. If pieces of the information do not correspond to each other, the location information of the UE may not be provided to the application.

According to an embodiment of the disclosure, the information provision condition may include a plurality of conditions and, if the plurality of conditions is included, may include information on a precedence relation or a priority relation.

The operation of the information manager described in the embodiment of the disclosure may be performed by the controller 250.

The storage unit 270 may store a program or commands for the UE 200. The controller 250 may execute the program or the instructions stored in the storage unit 270.

The storage unit 270 may include at least one type of storage medium of a flash memory type, a hard disk type, a multimedia card micro type, a card type memory (for example, an SD memory, an XD memory or the like), a random access memory (RAM), a static RAM (SRAM), a read-only memory (ROM), an electrically erasable programmable ROM (EEPROM), a PROM, a magnetic memory, a magnetic disk, and an optical disk.

The display unit 290 displays (outputs) information processed by the UE 200. For example, the display unit 290 may display information corresponding to an application, a program or a service which is currently executed, along with a user interface (UI) or a graphic user interface (GUI).

The display unit 290 may form a mutual layer structure together with the input unit 230 to operate as a touch screen. At this time, the display unit 290 operating as the touch screen may perform a function of the input unit.

Figure 3:
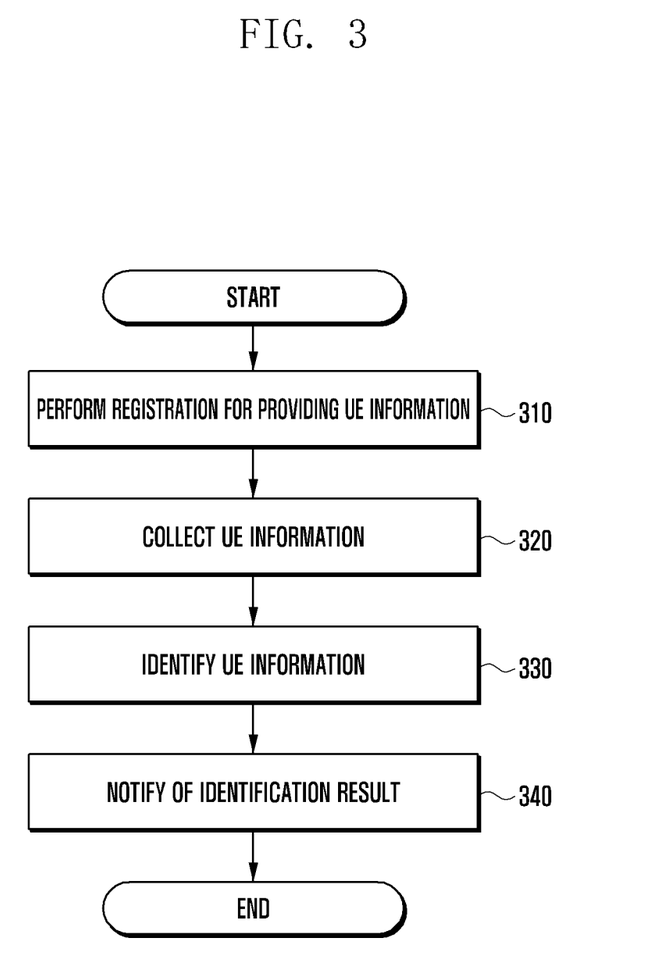
FIG. 3 illustrates a procedure of notifying of UE information according to an embodiment of the disclosure.

FIG. 3 illustrates a procedure of notifying of UE information according to an embodiment of the disclosure.

Referring to FIG. 3, in operation 310, a registration procedure for providing UE information may be performed. The information manager may receive a request for providing information from the application and store UE information corresponding to the application or a UE information provision condition in response to the request for providing the information. The request for providing the information may be triggered by a user input through a dedicated application. The UE information provision condition may be named an information notification condition or an information notice condition. A plurality of conditions may be included for one application. If UE information which the application registers in the information manager is acquired from the UE through a registration procedure, a request for providing the corresponding information to the application or a request for notifying the application of reception of the corresponding information may be made. For example, if the location of the UE is B, application A may make a request for notifying of UE information. In this case, location B may be the UE information provision condition. A detailed embodiment of the registration procedure will be described with reference to FIG. 4. Since a plurality of applications can be installed in the UE, the registration procedure may be performed for the plurality of applications.

In operation 320, the UE may collect UE information. The UE may collect or acquire UE information through the information collector. The UE information may be information directly acquired or measured by the UE collector, information received from an entity output the UE, or information obtained by analyzing information acquired by the UE. The information collector may provide UE information to the information manager. The UE information may be periodically or aperiodically provided to the information manager.

In operation 330, the information manager may identify UE information. The information manager may identify whether the acquired UE information corresponds to UE information registered for the application. For example, if it is identified that the location of the UE is location B through the UE information, it may be determined that the UE information provision request condition for application A is satisfied.

In operation 340, the UE information identification result may be notified to the application. For example, if location B is identified through the UE information, information on location B may be provided to application A. If application A is in the inactive state, application A may be controlled to switch to the active state. Further, the UE may inform that application A satisfies a preset condition.

In the same way, the application is not required to maintain the active state to identify UE information. If the application just registers a request for providing required UE information in the information manager, the information manager may determine whether the UE information requested by the particular application is satisfied and notify the application thereof.

If n applications desire to provide services on the basis of UE information in the prior art, n applications should check UE information in the active state, so that efficiency may deteriorate in the light of memory and power consumption. However, in the embodiment of the disclosure, n applications can receive activation switching information and UE information from the information manager even though the n applications enters the inactive state after performing the registration procedure for providing UE information and thus directly not check the UE information, thereby increasing efficiency in the light of memory and power management.

Figure 4:
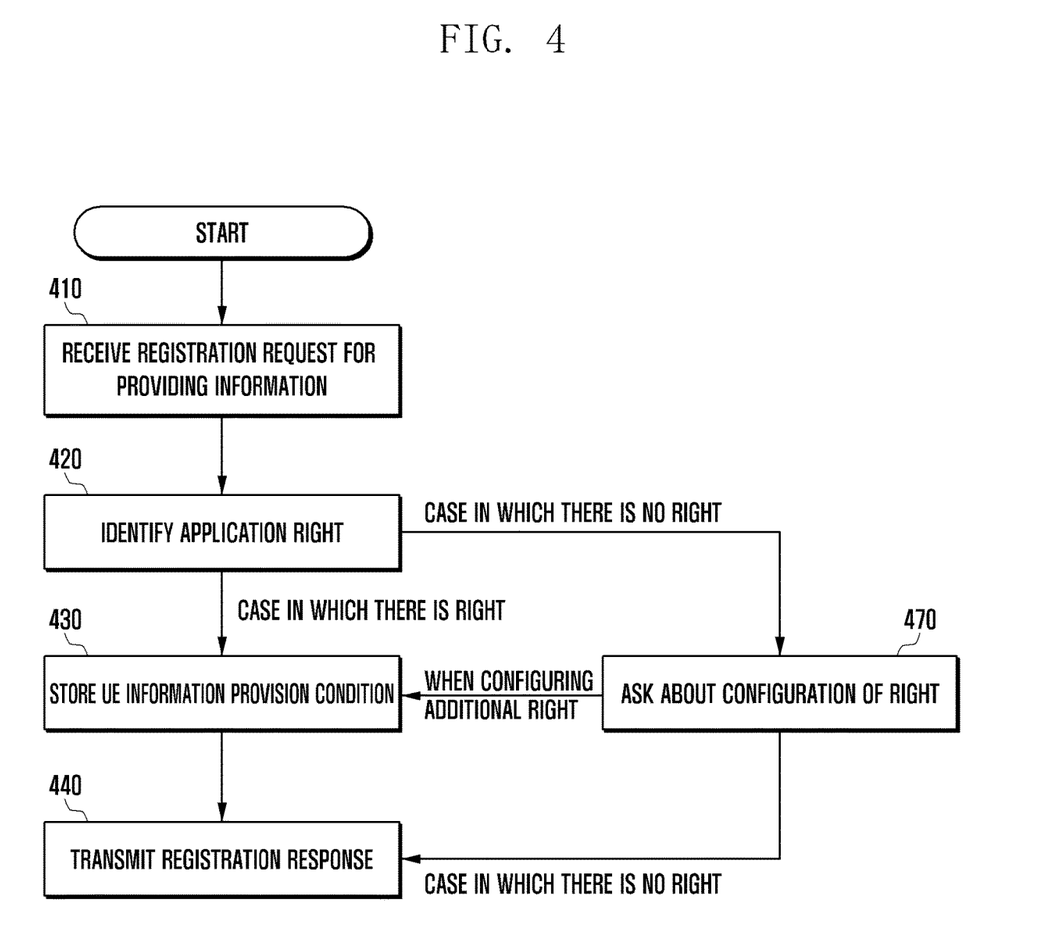
FIG. 4 illustrates a registration procedure according to an embodiment of the disclosure.

FIG. 4 illustrates a registration procedure according to an embodiment of the disclosure.

Referring to FIG. 4, in operation 410, the UE may receive a registration request for providing UE information from an application installed in the UE. For the registration request, a registration request for a particular application may be input through the application performing the registration procedure and information provision or the application requiring the registration may directly transmit the registration request. The registration request for providing information may be named an information provision request. The registration request may contain a UE information provision condition. Further, the registration request may contain information for identifying an application. For example, the information manager of the UE may receive a registration request for providing the UE information from the application. A plurality of applications may be installed in the UE and the UE may receive a registration request from the plurality of applications. It is assumed that a registration request is received from application A installed in the UE in FIG. 4.

In operation 420, the UE may verify a right of the application transmitting the registration request. The UE may determine whether the application transmitting the registration request is a rightful/appropriate application for the registration procedure to receive UE information. For example, the information manager may determine whether the application transmitting the registration request is an application having a right to receive UE information. For example, the procedure for determining whether the application is an application having a right may be a process of, if there is a condition pre-appointed or preset between a provider of the application and a manufacturer of the UE or a provider providing a service to the UE, determining the condition. Alternatively, the right may be configured inside the UE to allow the application to receive the UE information. The user may configure the UE to selectively assign a right to receive UE information to a particular application. Operation 420 may be omitted. That is, the operation for determining the right can be omitted, in which case the process may directly proceed to operation 430 after operation 410. Further, if the registration request is received, a request for content to the registration procedure may be made to the user through popup or notification. If there is user's consent, operations after operation 430 may be performed.

If the application has the right to receive UE information, the processor proceeds to operation 430. If the application has no right to receive UE information, the processor proceeds to operation 470.

If it is determined that the application is the application having the right to receive UE information, the UE may store a UE information provision condition in operation 430. The UE information provision condition may be named an information notification condition or an information notice condition. For example, the information manager of the UE may identify the UE information provision condition contained in the registration request and store the UE information provision condition. If the application transmits a UE request containing a plurality of conditions, the UE may store the plurality of conditions. If there is a plurality of conditions and there is a priority between conditions or a preceding condition between conditions, the UE may also store the corresponding information. The information manager may map an application to a condition corresponding to the application and store them, and may manage a mapping table therefor as shown in [Table 1].

TABLE 1

| Application | Information provision condition | Priority | Preceding condition | Others |
|---|---|---|---|---|
| A | Location 1, location 2, battery condition | Battery condition | | |
| B | Movement speed 1 | | | UE state |
| C | Time, location 3 | | Time→location | |

For example, with respect to application A, location 1, location 2, and a battery condition may be stored as the UE information provision condition. In analysis except for the priority, location 1 or location 2 may indicate a request for providing UE information. Since there is no preceding condition, there is no preceding condition to be met for location 1 and location 2 in order to provide UE information. The battery condition may be set as the priority. For example, if the battery is lower than a preset capacity, a request for UE information may not be made not to execute the corresponding application. Accordingly, it may be analyzed that the battery condition is met if the priority is set and UE information is provided if the UE is at location 1 or location 2.

If a preceding condition is set, location 1 may be a preceding condition of location 2. In this case, when the UE enters location 2 via location 1, it may be configured to provide UE information. For example, in order to provide a coupon to a customer entering a particular place, application A may make a request for providing UE information. In this case, a person coming to location 2 via location 1 may be determined as a customer to enter and a coupon may be provided to the person. On the other hand, a person coming to location 1 via location 2 is a customer to exit and thus the corresponding coupon may be provided to the person. Accordingly, if the preceding condition is met as described above, the request for providing UE information can be made.

With respect to application B, movement speed 1 may be stored as the condition. Application B may be analyzed that the UE provides UE information to application B moving at preset movement speed of 1 or higher. As other conditions, for example, the state of the UE may be used. If the state of the UE is an active mode, a request for providing corresponding information may be made. Other conditions may be analyzed as preceding conditions or priorities.

With respect to an application, time 1 and location 3 may be stored as the condition. If there is no preceding condition, it may be analyzed that UE information is provided when the condition of time 1 or location 3 is met. Time 1 may be a priority condition of location 3. UE information may not be provided if only the location condition is met and UE information may be provided if both the time condition and the location condition are met.

For example, an interval from a first time to a second time may be a business time of a particular store. In this case, the interval may be set as time 1 and a location of the store may be location 3. If it is determined that providing information through an application only during the business time is effective, it may be configured that the UE satisfying the condition of time 1 provides UE information when the UE is at location 3.

If there is a plurality of information provision conditions and if all of the plurality of conditions is met, it may be determined that a condition for finally providing UE information is met. If only at least one of the plurality of conditions is met, it may be determined that a condition for providing UE information is met. A reference therefor will be provided while being inserted into the registration request.

In operation 440, the UE may transmit a registration response to the application. The information manager of the UE may transmit a response message to the application. If the UE information provision condition for the application is successfully registered, a response message containing registration success information may be transmitted. If the registration procedure is not successful, a response message containing registration failure information may be transmitted. Operation 440 may be omitted. If the application receives the response message containing registration success information, the application may switch to an idle state.

If it is determined that there is no right on the basis of the determination result in operation 420, operation 470 may be performed. In operation 470, the UE may set an additional right for the application. This is because the application has no right at a time point at which the registration request is made but the user may configure a right in the future.

Alternatively, a right may be acquired through a system or an update of the application. In operation 470, a right for the application may be automatically acquired or whether to configure a right may be asked to the user through popup or notification and then the right for the application corresponding to user input may be assigned.

An additional right may be configured through operation 470, operation 430 may be performed. Operations after operation 430 are the same as the description made above.

If an additional right is not configured, operation 440 may be performed. Since the corresponding application has no right, the information manager may transmit a registration response message to the application and the registration response message may contain registration failure information. If the registration failure information is contained, the corresponding application may analyze that registration of a condition for receiving UE information fails. In this case, the application may maintain an active state. The application may maintain the active state and directly collect UE information in which case the corresponding is always in the active state and thus have a loss in memory management and power management.

Figure 5:
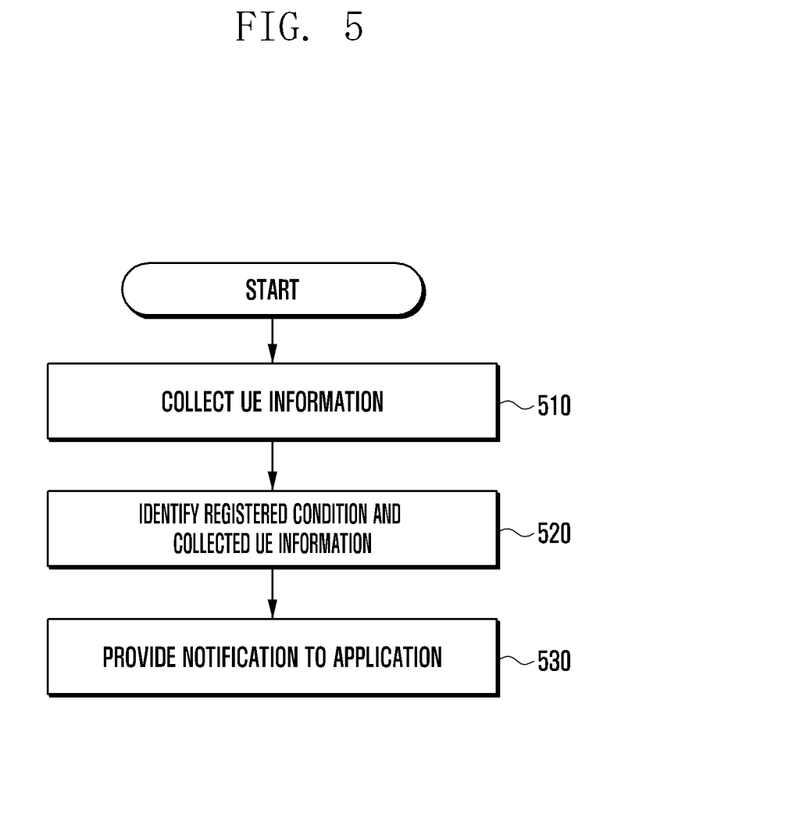
FIG. 5 is a procedure of providing UE information according to an embodiment of the disclosure.

FIG. 5 is a procedure for providing UE information according to an embodiment of the disclosure.

Referring to FIG. 5, in operation 510, the UE may collect UE information. The UE may collect or acquire UE information through the information collector. The UE information may be information directly acquired or measured by the UE collector, information received from an entity outside the UE, or information obtained by analyzing information acquired by the UE. The information collector may provide UE information to the information manager. The UE information may be periodically or aperiodically provided to the information manager.

In operation 520, the UE may identify a registered UE information provision condition and collected UE information. The UE may identify whether there is UE information corresponding to the UE information provision condition registered in the UE among the collected UE information. The UE information may include information on a mobile communication base station which the UE accesses, a cell ID, a tracking area information, routing area information, roaming information, information on an access point (AP) to which the UE is connected, information on a connection state of the UE (state information indicating whether the UE is in a connected state or an idle state), information indicating the location of the UE through a global positioning system (GPS), information on a date and time, or information collected through other sensor devices. The information manager may directly compare not only the collected UE information with the UE information provision condition but also perform comparison after analyzing at least one of the UE information and the UE information provision condition. For example, if a cell ID or TAU information is used as the UE information, location information acquired from cell ID information or TAU may be compared with information configured as the UE information provision condition.

For example, it may be assumed that the UE information provision condition of [Table 1] is configured in FIG. 4. If location 1 is collected as UE information and the current battery state satisfies a battery condition, the UE may identify that the information provision condition for application A is met. For example, if a movement speed of the UE collected as UE information satisfies the condition of movement speed 1, it may be identified that the information provision condition for application 2 is met. For example, if time information of the UE satisfies the condition of time 1 and the condition of location 3, it may be identified that the information provision condition for application C is met. If the condition of location 3 is met but the condition of time 1 is not met, it may be identified that the information provision condition for application C is not met.

If UE information satisfying the registered condition is collected, the UE may notify of the identification result of the corresponding application in operation 530. The identification result may be a notification for activating the application or a notification for providing information required by the corresponding application. Further, the identification result may be a notification provided by the UE to inform that the corresponding application satisfies a preset condition.

Operation 530 may be different in the case in which the corresponding application in an inactive state and the case in which the application is in an active state.

In the case in which the application is in the inactive state, it is required to switch the corresponding application to the active state. This is because the inactive state of the application is a state in which the application cannot collect nor receive UE information in the disclosure. If the application is in the inactive state, the application may not occupy nor use the memory of the UE. If the application which does not occupy nor use the memory in the inactive state switches to the active state, the application occupies the memory and uses memory resources.

For example, if the application is in the inactive state, the information manager may transmit a message for controlling the application to switch from the inactive state to the active state. Since the application cannot receive nor collect UE information in the inactive state, if the application satisfies the configured condition, the information manager may transmit a message for controlling the corresponding application to switch to the active state. If the application becomes the active state, the information manager may provide UE information to the corresponding application. The operation in which the information manager provides UE information may be omitted in which case the application switching to the active state may make a request for UE information to the information collector or the information manager. For example, the request for providing UE information is made using a pull scheme, and a response containing UE information may be received from the information manager or the information collector.

Since the application switches to the active state through a notification from the information manager while the application is in the inactive state, the application is not required to always maintain the active state in order to acquire UE information and thus memory and power can be efficiently managed.

If the application is in the active state, UE information corresponding to the application may be provided. In this case, transmission of a message for switching the inactive state to the active state is not needed. Further, the application may transmit a message containing a notification indicating collection of registered UE information. Although the application is in the active state, the application does not always check UE information but the information manager may determine whether the registered condition of the UE is met and inform the application of the result thereof, and thus it is possible to reduce memory or power consumption generated for collection of UE information by the application.

Embodiments of the disclosure may be used for various fields and various purposes according to application type and UE information. An advertisement and coupon service based on location information of the UE may be provided. If an IoT UE is in a connected mode at a particular time, UE information may be provided to a preset application. In the case of an application for health care, the service may be triggered on the basis of health-related information (heart rate, body temperature, movement distance, and movement speed) collected by the UE and information may be provided to the user. The content found through a search application may be configured as a condition. For example, an application related to reservation of a movie may configure a UE information identification condition to be triggered when a movie is searched for or the movie-related content is identified through a search application of the UE.

Meanwhile, if the operation according to an embodiment of the disclosure is implemented through the application, an implementation example will be described with reference to FIGS. 6 to 8. In the disclosure, a registration procedure for providing UE information and information provision may be implemented through a dedicated application. The operation of the information manager may provide a user interface through a dedicated application in the disclosure. In this case, all of N applications which desire to acquire UE information consume memory and power in order to acquire UE information while maintaining the active state in the prior art. In the embodiment of the disclosure, if N applications are registered to a dedicated application for providing UE information, the dedicated application identifies whether information required by the corresponding applications is collected. Since the operation individually performed by the N conventional applications is performed by one dedicated application, memory and power can be efficiently managed.

Figure 6:
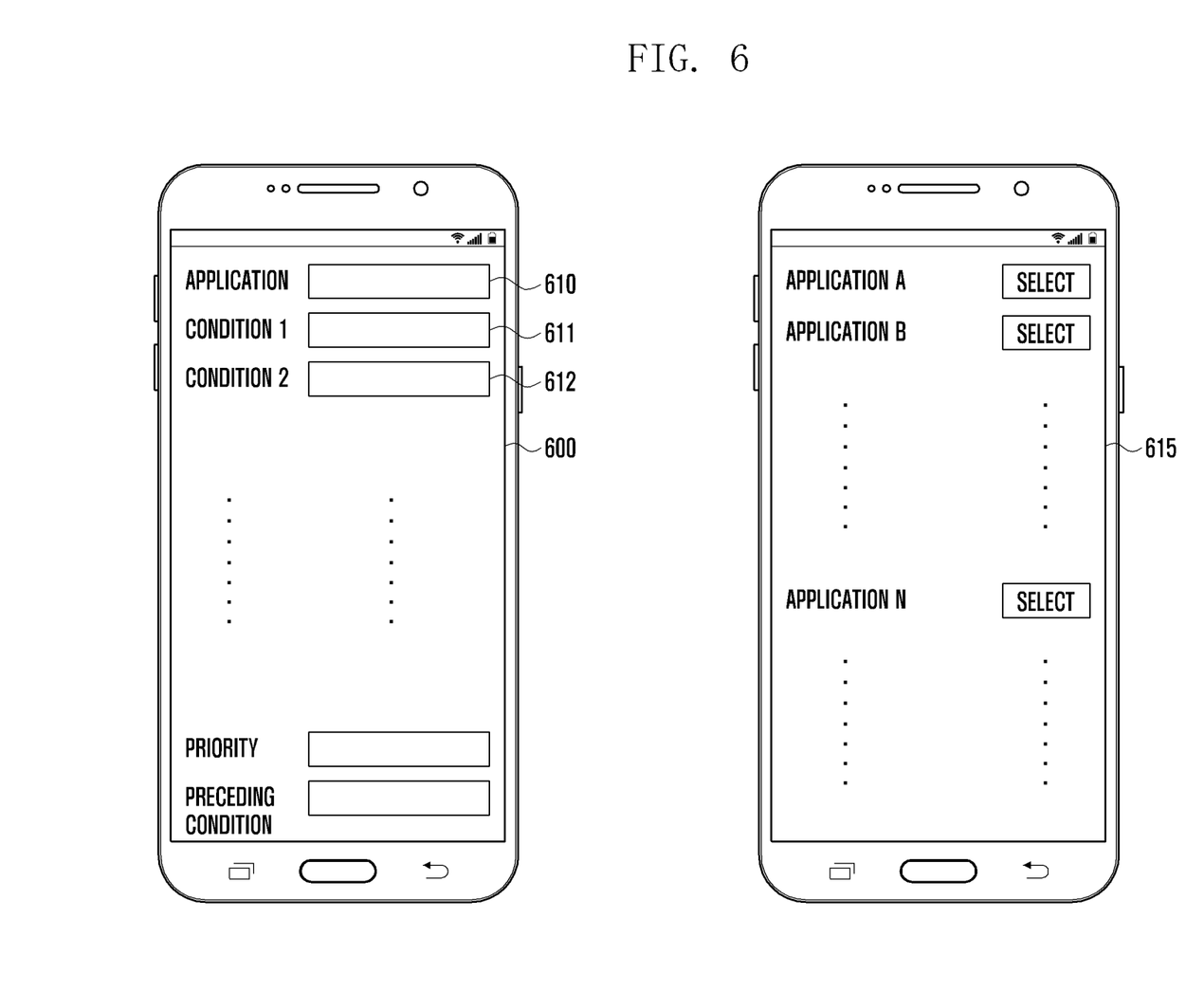
FIG. 6 illustrates registration through an application according to an embodiment of the disclosure.

FIG. 6 illustrates registration through an application according to an embodiment of the disclosure.

Referring to FIG. 6, reference numeral 600 indicates a screen displayed on a display unit of the UE when the registration procedure is performed. A field 610 for inputting information on the application and fields 611 and 612 for inputting a condition may be displayed on the screen. In addition, a field for displaying a priority condition 613 and a preceding condition 614 may be displayed. The fields may be displayed together on one screen or successively displayed on different screens.

A screen 615 is a screen showing an embodiment in the case in which the field 610 is touched on the screen 600. In order to perform the registration procedure, information for directly identifying an application may be input into the field 610, and when there is an input in the field 610, a screen 615 may be displayed. A plurality of applications installed in the UE may be displayed on the screen 615, and a field for selecting an application may be also displayed. If a particular application is selected on the screen 615, corresponding information of the application may be input into the application field 610 on the screen 600.

The procedure for selecting an application and configuring a condition for the selected application in FIG. 6 may correspond to the procedure for receiving or inputting the registration request in the embodiment of the disclosure.

Figure 7:
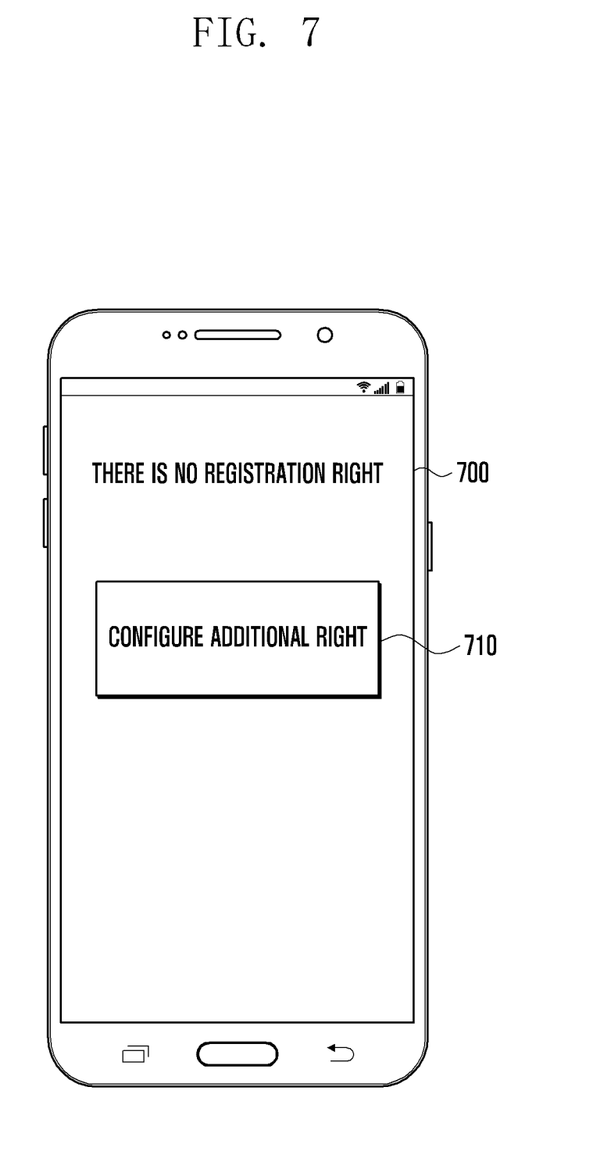
FIG. 7 illustrates configuration of a right through an application according to an embodiment of the disclosure.

FIG. 7 illustrates configuration of a right through an application according to an embodiment of the disclosure.

Referring to FIG. 7, a screen 700 shows an interface for identifying a registration right and configuring an additional right. The interface of FIG. 7 may be displayed when the application is selected in FIG. 6 or after the registration request is received after the condition is input in FIG. 6. If the registration procedure and the right to provide UE information are pre-configured in the application, the process of FIG. 7 may be omitted. If the corresponding application has no registration right, no registration right may be displayed on the screen 700. Since the application has no registration right, the procedure may be terminated, or the registration procedure and the right to provide UE information may be configured in the corresponding application through an additional right configuration field 710 and a right to use the corresponding service may be configured in the application.

Figure 8:
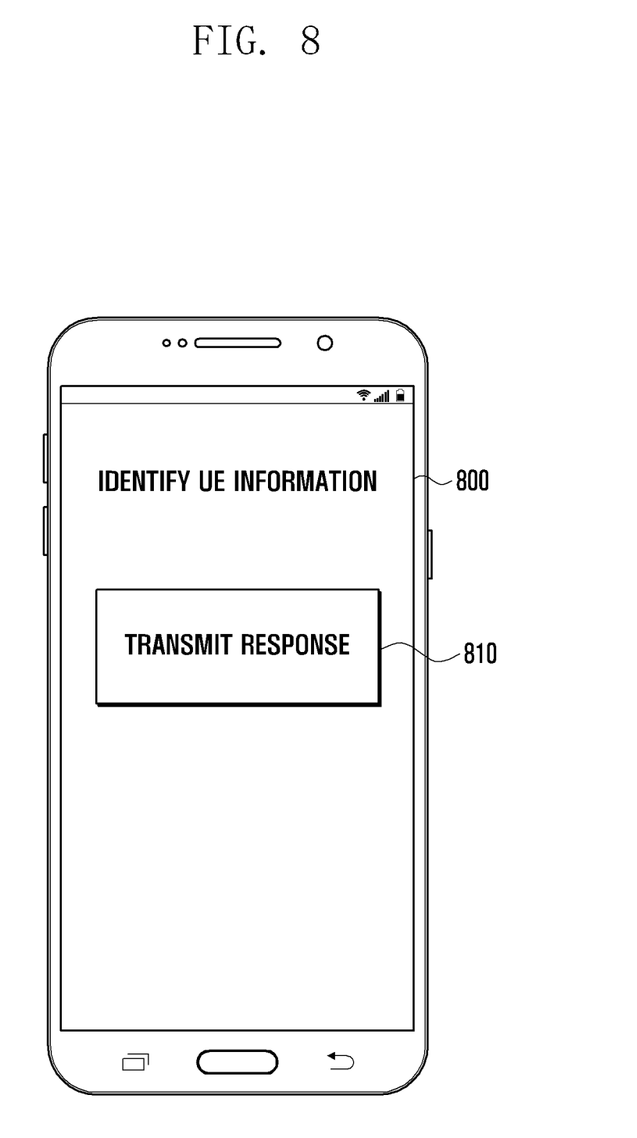
FIG. 8 illustrates transmission of a registration response through an application according to an embodiment of the disclosure.

FIG. 8 illustrates transmission of a registration response through an application according to an embodiment of the disclosure.

Referring to FIG. 8, if an application registers a condition and then information corresponding to the corresponding application is collected in the embodiment of the disclosure, UE information may be provided to the user without notification or UE information may be provided according to identification by the user.

If information is provided to the user through the notification, an interface such as a screen 800 may be provided. Information indicating that UE information is identified may be displayed in which case a corresponding application and identified information of the corresponding application may be also displayed. A response transmission field 810 may be displayed, and if there is a user input in the response transmission field 810, identified UE information may be provided to the corresponding application. If there is no user input for a preset time, it may be considered as consent and thus information may be provided or it may be inversely considered as the user does not agree and thus corresponding information may not be provided. This may follow the configured condition.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method of providing information by a terminal, the method comprising:
   receiving a registration request including an information provision condition related to an application;
   storing the information provision condition;
   identifying whether information corresponding to the information provision condition is collected;
   in case that the information corresponding to the information provision condition is identified, providing the information to the application; and
   in case that the application is in an inactive state, switching the application to an active state and, in case that the application is in the active state, providing information on the terminal,
   wherein the inactive state is a state in which the application does not use a memory of the terminal.

2. The method of claim 1, further comprising identifying whether the application has a right to receive the information and, in case that it is determined that the application has the right, storing the information provision condition.

3. The method of claim 2, further comprising, in case that it is determined that the application has no right, rejecting the registration request including the information provision condition and maintaining an active state of the application.

4. The method of claim 1, wherein the information provision condition includes location information.

5. The method of claim 4, wherein, in case that location information of the terminal is collected, it is determined whether the location information of the terminal corresponds to location information of the information provision condition.

6. The method of claim 1, wherein the information provision condition includes a plurality of conditions and, in case that the plurality of conditions are included, includes information on a precedence relation or a priority relation.

7. A terminal, comprising:
   a transceiver configured to transmit and receive signals; and
   a controller configured to:
      collect information on the terminal,
      receive a registration request including an information provision condition related to an application,
      store the information provision condition,
      identify whether information corresponding to the information provision condition is collected,
      in case that the information corresponding to the information provision condition is identified, provide the information to the application, and
      in case that the application is in an inactive state, the controller switches the application to an active state and, in case that the application is in the active state, provides information on the terminal,
   wherein the inactive state is a state in which the application does not use a memory of the terminal.

8. The terminal of claim 7, wherein the controller is configured to identify whether the application has a right to receive the information and, in case that it is determined that the application has the right, store the information provision condition.

9. The terminal of claim 8, wherein, in case that it is determined that the application has no right, the controller is configured to reject the registration request including the information provision condition and maintain an active state of the application.

10. The terminal of claim 7, wherein the information provision condition includes location information, and in case that location information of the terminal is collected, the controller is configured to determine whether the location information of the terminal corresponds to location information of the information provision condition.

11. The terminal of claim 7, wherein the information provision condition includes a plurality of conditions and, in case that the plurality of conditions are included, includes information on a precedence relation or a priority relation.

* * * * *